United States Patent [19]

White

[11] Patent Number: 4,774,682

[45] Date of Patent: Sep. 27, 1988

[54] NONLINEAR STATISTICAL SIGNAL PROCESSOR

[75] Inventor: Stanley A. White, San Clemente, Calif.

[73] Assignee: Rockwell International Corporation, El Segundo, Calif.

[21] Appl. No.: 845,227

[22] Filed: Mar. 27, 1986

[51] Int. Cl.[4] ............................................. G06G 7/48
[52] U.S. Cl. .............................. 364/554; 364/571.01; 375/10; 324/77 A
[58] Field of Search ............... 364/554, 555, 571, 178, 364/180, 183, 715, 718; 375/10; 455/66–68; 324/77 R, 77 A

[56] References Cited

U.S. PATENT DOCUMENTS

| | | | |
|---|---|---|---|
| Re. 29,460 | 10/1977 | Mills | 364/724 |
| 3,969,700 | 7/1976 | Bollinger et al. | 340/146.3 |
| 4,090,242 | 5/1978 | Lerma et al. | 364/554 |
| 4,115,867 | 9/1978 | Vladimirov et al. | 364/554 |
| 4,159,418 | 6/1979 | Marom | 250/199 |
| 4,207,624 | 6/1980 | Dentino et al. | 367/135 |
| 4,227,177 | 10/1980 | Moshier | 340/146.3 |
| 4,241,329 | 12/1980 | Bahler et al. | 340/146.3 |
| 4,288,781 | 9/1981 | Sellner et al. | 340/146.3 |
| 4,295,218 | 10/1981 | Tanner | 371/40 |
| 4,316,259 | 2/1982 | Albrecht et al. | 364/718 |
| 4,354,177 | 10/1982 | Sloane | 340/347 |
| 4,449,822 | 5/1984 | Yuasa et al. | 356/227 |
| 4,542,514 | 9/1985 | Watanabe | 375/10 |
| 4,554,509 | 11/1985 | Cornett | 329/105 |
| 4,573,133 | 2/1986 | White | 364/571 |

OTHER PUBLICATIONS

Langenthal, "Analyzing Signals for Data", from Instruments and Control Systems, Dec. 1970, pp. 87–89.

Primary Examiner—Parshotam S. Lall
Assistant Examiner—Brian M. Mattson
Attorney, Agent, or Firm—H. Fredrick Hamann; George A. Montanye

[57] ABSTRACT

A signal processor is for receiving an input signal y. The input signal y has in it a signal x and has a conditional density function, given that the signal x is present, $p(y|x)$. The signal processor includes a memory for storing the amplitude-density-function of the signal x, $p(x)$. The memory is coupled to the processor input so that the memory is addressed by the input signal y. An amplitude-density-function generator is coupled to the processor input and to the memory generates the product of the conditional density function $p(y|x)$ and the density function $p(x)$. The processor of the invention also includes apparatus for detecting the peak of that product.

24 Claims, 7 Drawing Sheets

MAP GENERATOR FOR UNIFORM AMPLITUDE DENSITY

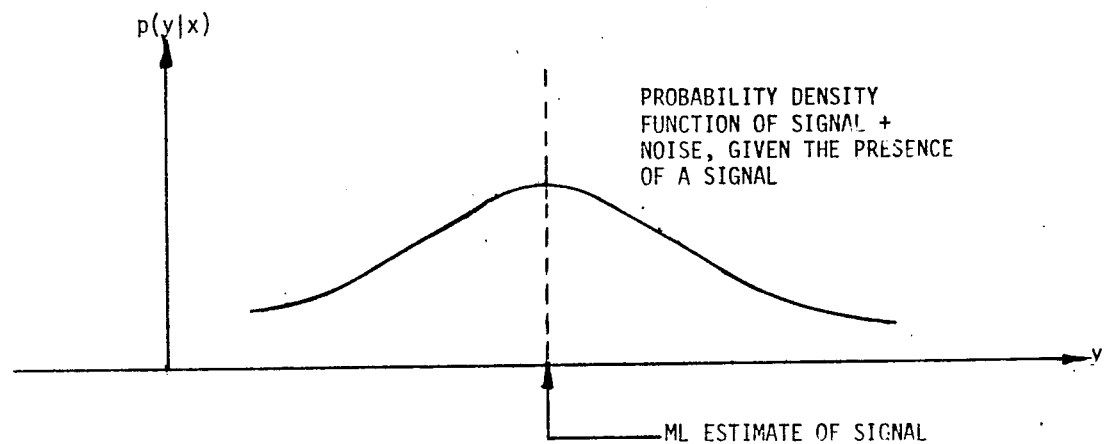
FIG. 1
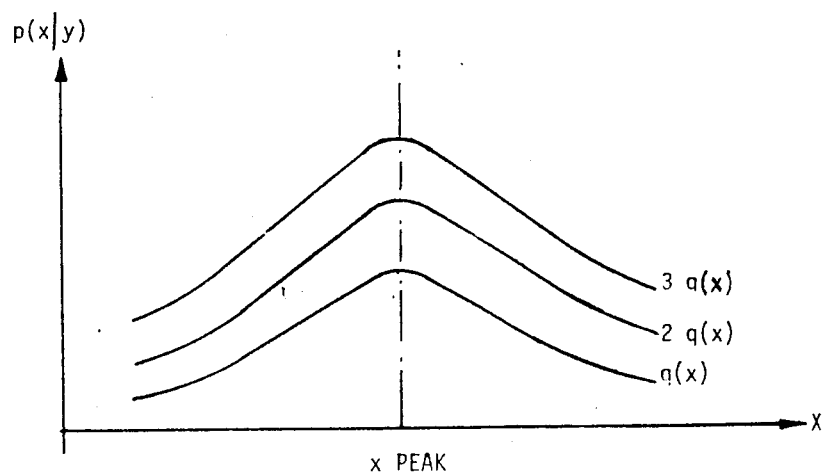
FIG. 6    FORM OF $p(x|y) = kq(x)$

THE AMPLITUDE DENSITY/DISTRIBUTION FUNCTION GENERATOR

MAP GENERATOR FOR UNIFORM AMPLITUDE DENSITY

ALTERNATE MAP GENERATOR FOR
SINGLE - STEP CORRECTION TECHNIQUE

BASIC MAP SIGNAL ESTIMATOR

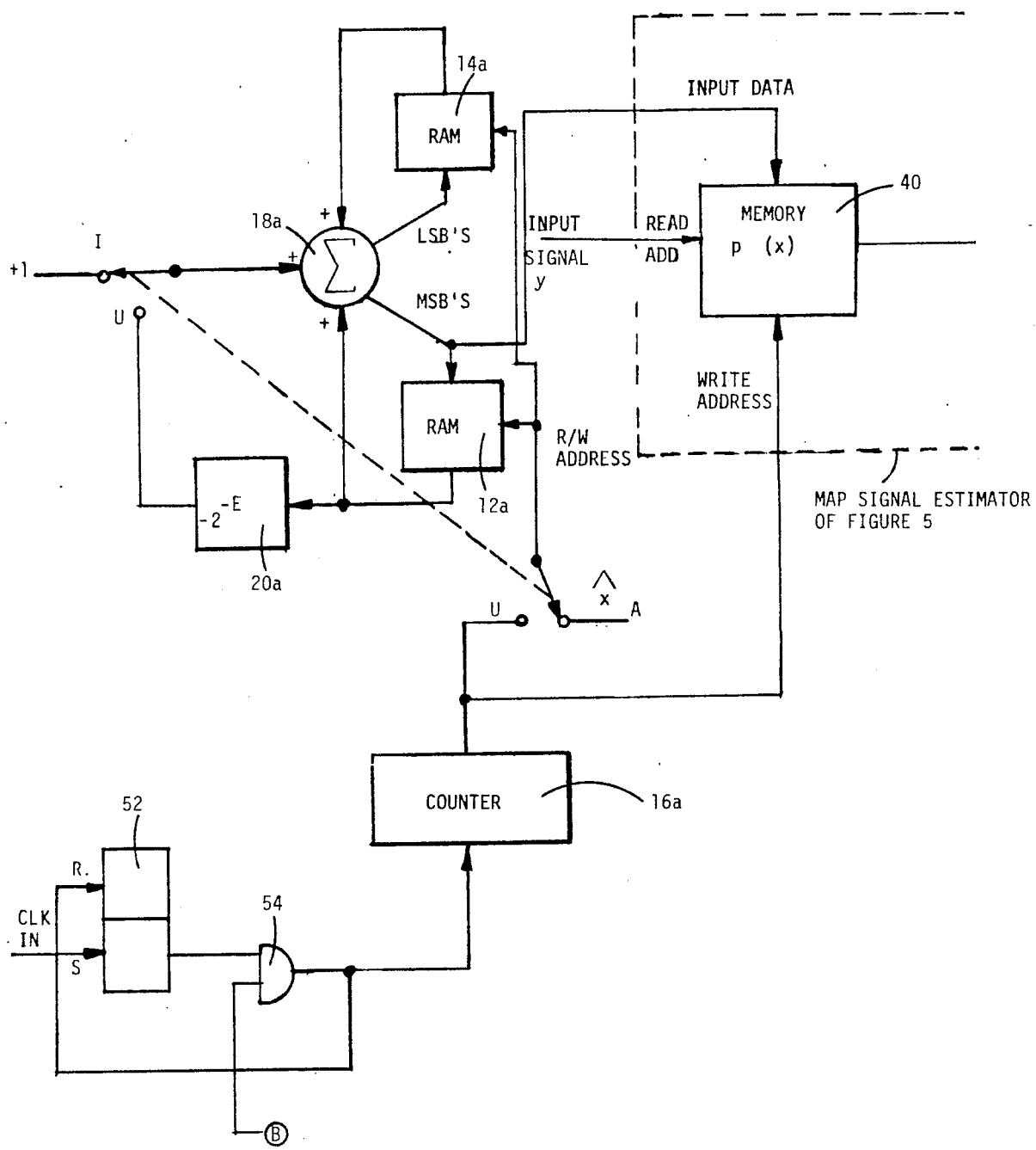
FIG. 7  MODIFICATION TO BASIC MAP SIGNAL ESTIMATOR FOR SIGNALS WITH TIME-VARYING STATISTICS Figure 9 MMSE Estimator For Nonstationary Signals

NONLINEAR STATISTICAL SIGNAL PROCESSOR

BACKGROUND OF THE INVENTION

The present invention relates to statistical signal processing.

A number of statistical signal-processing functions are useful for pattern recognition and classification, optimum detection and estimation, nonlinear adaptive filtering, nonlinear-distortion compensation, signal preconditioning, and other signal-processing functions. Such functions might include directly measuring the amplitude-density and distribution functions of a signal and extracting a variety of signal parameters from such signal, such as the mean, median, mode(s), and mean-squared values. Additional functions might include nonlinearly mapping the signal such that its distribution/density function follows that of any specified model. Also of interest might be functions to provide the maximum likelihood (ML), maximum a posteriori (MAP), and minimum mean-squared error (MMSE) signal estimates.

Such functions are generally to be performed on preprocessed signals, such as the output signals from FFTs, demodulators, or other feature-extraction devices.

SUMMARY OF THE INVENTION

The present invention is a circuit useful for performing a variety of statistical signal-processing applications. It can perform functions such as:

1. directly measure the amplitude-density and distribution functions of a signal and extract a variety of signal parameters such as the mean, median, mode(s), and mean-squared values;
2. nonlinearly map the signal such that its distribution/density-function follows that of any specified model; and,
3. provide maximum likelihood (ML), maximum a posteriori (MAP), and minimum mean-squared error (MMSE) signal estimates.

The invention is a signal processor for receiving an input signal y. The input signal y has in it a signal x and has a conditional density function, given that the signal x is present, $p(y|x)$. The signal processor includes a memory for storing the amplitude density function $p(x)$ of the signal x. The memory is coupled to the processor input so that the memory is addressed by the input signal y. An amplitude density function generator is coupled to the processor input and to the memory to generate the product of the conditional density function $p(y|x)$ and the density function $p(x)$. The processor of the invention also includes apparatus for detecting the peak value of that product.

BRIEF DESCRIPTION OF THE DRAWINGS

FIG. 1 shows an exemplary probability-density function of a signal buried in noise.

FIG. 6 shows the form of the conditional density function of a signal x, given that the signal is contained in noise.

FIG. 7 shows a modification to the MAP signal detector/estimator of FIG. 5 for signals having time varying statistics.

DETAILED DESCRIPTION OF THE PREFERRED EMBODIMENTS

Signal Detection

Figure 2:
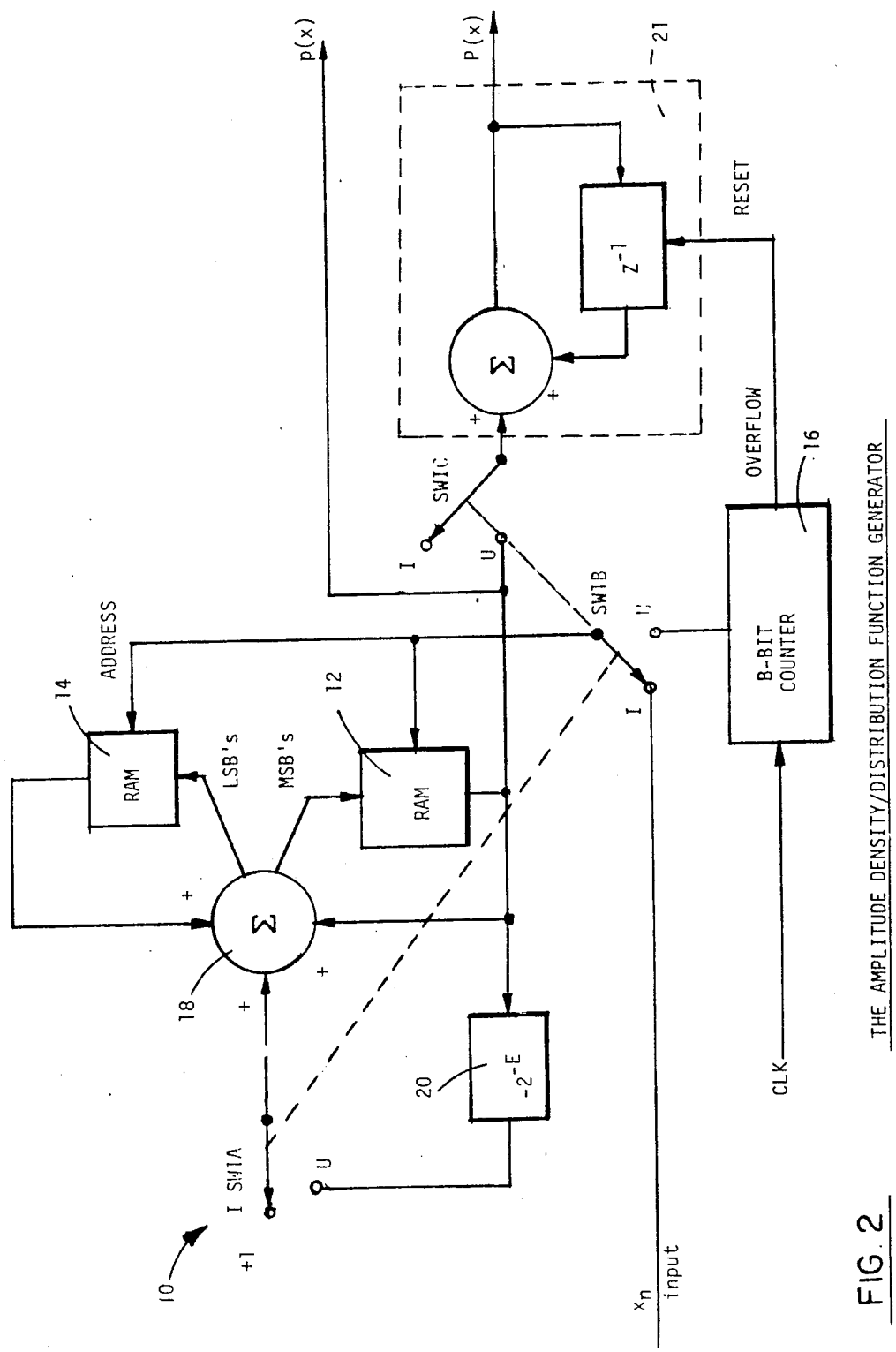
FIG. 2 shows a block diagram of an Amplitude Density/Distribution Function Generator (ADFG) that may be used in the signal detector/estimator of the invention.

A maximum-likelihood (ML) detector may be used to determine the presence of a signal in noise. See Mischa Schwartz and Leonard Shaw, *Signal Processing: Discrete Spectral Analysis, Detection, and Estimation*, McGraw-Hill, 1975, Chapter 6.

A peak detector in conjunction with the amplitude-density function generator provides the ML signal estimate. A possible signal-plus-noise density function shape is given in FIG. 1.

The present invention permits direct mechanization of nonlinear Bayes estimators, which are useful for signal detection and estimation in communications and other processes. The embodiments of the invention described herein are a maximum a posteriori (MAP) signal detector/estimator, and a minimum-mean-squared-error (MMSE) signal detector/estimator.

The Bayes equation is:

$$p(x|y)\,p(y) = p(y|x)\,p(x) = p(x,y) \quad (1)$$

in which:

$p(x|y)$ is the conditional density function of the variable x, given that the variable y is present;

$p(y|x)$ is the conditional density function of the variable y, given that the variable x is present;

$p(x)$ and $p(y)$ are the marginal density functions of x and y, respectively; and $p(x,y)$ is the joint density function of the variables x and y.

The Bayes equation may also be expressed as:

$$p(x|y) = \frac{p(y|x)p(x)}{p(y)} = \frac{p(y|x)p(x)}{\int_{-\infty}^{\infty} p(x,y)dx} \quad (2)$$

Integrating the variable x out of the joint density function, $p(x,y)$, generates the marginal density function, $p(y)$. We may, of course, express the joint density function again as a product of the conditional density function, $p(y|x)$ and the marginal density function, $p(x)$, as shown in Equation (1). Equation (2) becomes:

$$p(x|y) = \frac{p(y|x)p(x)}{\int_{-\infty}^{\infty} p(y|x)p(x)dx} \quad (3)$$

in which the denominator serves a gain-normalizing purpose. In the present text, x represents signal and y represents signal-plus-noise.

The ML estimator of equation (3), therefore, generates $p(x|y)$. One embodiment of the present invention generates the conditional density function $p(x|y)$, the a posteriori density function, given a prior knowledge of the signal density function, $p(x)$.

Equation (3) may be considered to consist of the product of a scale factor, k, and some other density function, $$p(x|y) = k \, q(x) \quad (4)$$

The mechanizations of the Bayes equations signal detectors/estimators in the present invention make extensive use of the amplitude-density functions and amplitude-distribution functions of input signals. Therefore, a description of a preferred amplitude-density and distribution-function generator follows.

Amplitude-Density-Function Generator (ADFG)

To understand how the nonlinear signal processor works, the operation and struction of its central portion, the amplitude-density function generator, (ADFG) is explained. The amplitude-density function generator is described more completely in U.S. Pat. No. 4,573,133, issued Feb. 25, 1986 to Stanley A. White, and entitled Signal Processor For Compensating Detector Non-Uniformities, the text of which is incorporated herein by reference. What follows here is a brief description of that device and its operation.

A histogram of a signal is simply a sum-of-occurrences plot. If the plot is normalized such that the area under the histogram is unity, it becomes the amplitude-density function, which is a frequency-of-occurrence plot. The integrated amplitude-density function is the amplitude-distribution function.

The amplitude-density and amplitude-distribution functions provide important information about the statistical profile of a signal, information such as the median, the probability that the signal is above or below a certain level, or the probability of finding the signal between a pair of predetermined values.

Shown in FIG. 2 is an amplitude density and distribution function generator of the type described in the above-referenced U.S. Patent. The amplitude-density-function generator (ADFG) 10 computes the density function $p(x)$ of the input signal, x. The density function $p(x)$ is applied to an integrator to generate the distribution function $P(x)$.

When the generator is in the input mode, the switches SW1A, SW1B, SW1C are set in the positions indicated by I. The input signal ($x_n$) addresses the random access memories (RAMs) 12, 14 via a switch SW1B. The memories 12, 14 contain time-filtered histograms of the input signal $x_n$. Each RAM has storage capability for $2^B$ words, where B is the number of bits in the signal $x_n$, such as 8, 10, 12, etc. The word length in the first RAM 12 is L bits; the word length in the second RAM 14 is E bits, and L=B+E. Each RAM is addressed by an address line connected to the switch SW1B.

During the first half of each clock period, the generator is in the input mode, with the switches SW1A, SW1B, and SW1C in their I position. The input sample, $x_n$, is picked up by the switch SW1B, through which the input addresses the memory location that is numerically equal to the value of $x_n$. Through the switch SW1A the content of the addressed memory location is augmented or incremented by 1 and placed back into the memory, with the L most-significant bits going to the first memory 12, and the E least-significant bits going to the second memory 14.

During the second half of the same clock period the switches SW1A, B and C, then toggle to the update, or "U" state. The state of a B-bit counter 16 becomes the memory address. The content of the addressed memory location is scaled by $1-2^{-E}$ and read back into the memories. Again, the L most-significant bits are placed in the first RAM 12, and the E least-significant bits are placed in the second RAM 14. That same data is output from the memory 12 as the amplitude density function, $p(x)$, the output of the amplitude-density function generator ADFG. Keeping the E least-significant bits through the use of the second memory 14 maintains the accuracy of the density function computation to a degree that is unattainable with just the first memory storing the L most-significant bits.

Simultaneously, via the switch SW1C, the density function $p(x)$ is input to an accumulator 21 to form the amplitude-distribution function $P(x)$. The accumulator 21 comprise an adder and a feedback line including a delay element.

At the beginning of the next clock period the switches SW1A, SW1B, SW1C toggle again to the input or "I" state. The counter overflow is used to reset the accumulator memory in the integrator generating the distribution function $P(x)$.

The output of the RAMs is filtered in a low pass filter according to the equation:

$$G(z) = \frac{1}{1 - (1 - 2^{-E})z^{-1}} = \frac{1}{1 - e^{-T/\tau}z^{-1}} \quad (5)$$

in which T is the sampling interval, E is a right shift of E bits, and $\tau$ is the effective time constant. E may thus be selected by evaluating $$E = -\log_2[1 - \exp(-1/\tau f_s)] \quad (6)$$

in which $f_s$ is the sampling frequency. Roundoff-noise gain is held to unity by the use of the second RAM to implement error feedback.

Amplitude-Density/Distribution-Function Shaping

If a single-valued functional relationship is defined as $y = f(x)$, the amplitude density function of signals x and y, $p_1(x)$ and $p_2(y)$, respectively, are related by $p_1(x)dx = p_2(y)dy$. See W. B. Davenport, Jr. and W. L. Root, *An Introduction To Theory of Random Signals and Noise*, McGraw-Hill, N.Y., 1958, Chapter 3. If the amplitude-distribution functions associated with those density functions $p_1(x)$ and $p_2(y)$, are defined as $D(x)$ and $C(y)$, respectively, the relationship between the density functions may be used to shape amplitude-density functions through the real-time on-line computing of the associated non-linear gain map. The amplitude-distribution function of a signal is its own map for the generation of a uniformly distributed signal, as shown in FIG. 3.

The "compute $D(x)$" density/distribution-function generator 10 may be the device illustrated in FIG. 2, with the output amplitude-distribution function $D(x)$, which is shown in FIG. 2 as $P(x)$, applied as data to a RAM. The counter 16 that provides the memory-update address to the ADFG (FIG. 2) may also be used to provide the write address to the RAM 22 that stores the amplitude-distribution function D(x).

Figure 3:
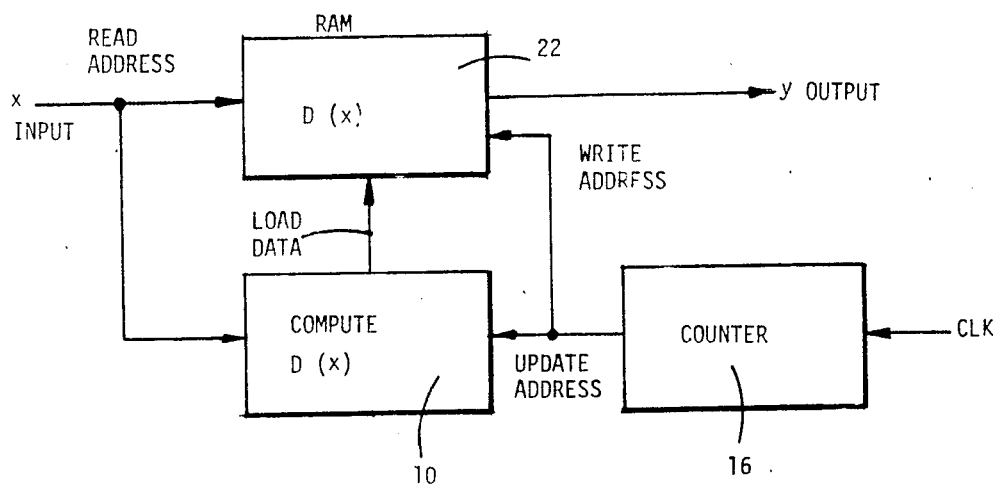
FIG. 3 shows a block diagram of a nonlinear amplitude-sample mapping circuit for generating a signal having a uniform amplitude density function from an arbitrary input signal with stationary statistics.
Figure 4:
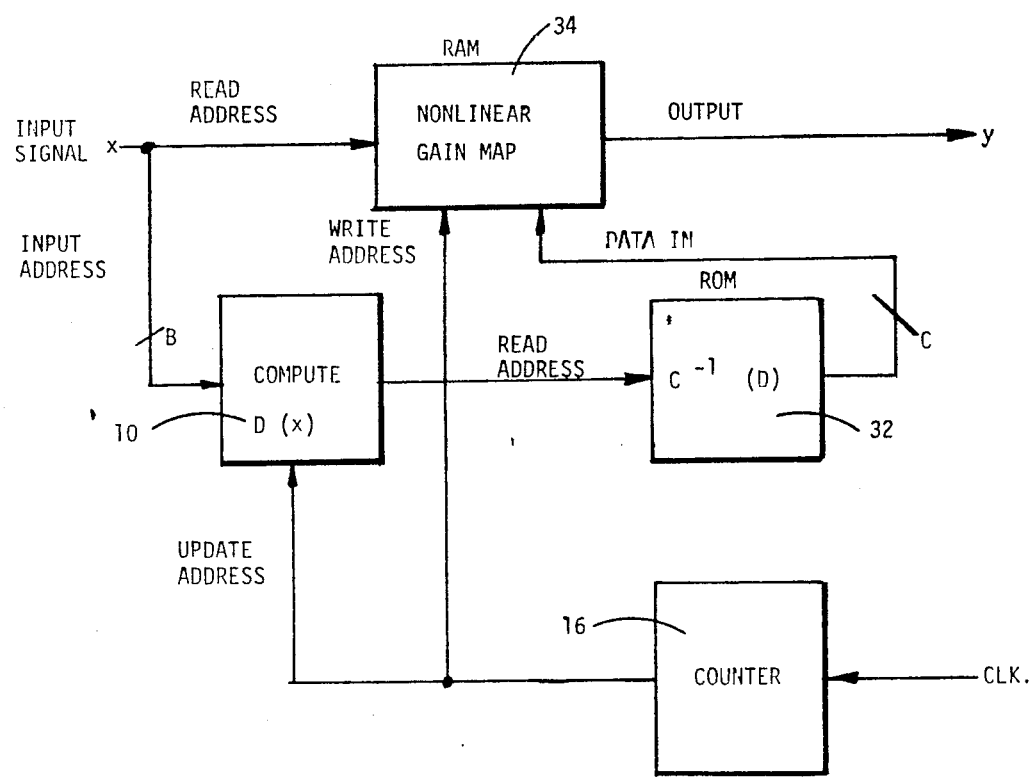
FIG. 4 shows an alternative mapping circuit for use in a single-step correction technique for generating a signal having an arbitrary but fixed amplitude-density function.

If the output signal y of the circuit shown in FIG. 3, which is the distribution function D(x), is used to address a memory in which the inverse of the desired output amplitude-distribution function $[C^{-1}(D(x))]$ is stored, the amplitude-density function of an arbitrary signal may be mapped from whatever it may have been to a desired form, using the system illustrated in block diagram in FIG. 4.

The input signal x is applied to the amplitude density/distribution-function generator 10, which computes the amplitude-distribution function of x, D(x). The output from that generator is applied to a read-only memory (ROM) 32 in which the inverse of the desired amplitude distribution function, $C^{-1}[D(x)]$, is stored. The generator output D(x) is used as the read address for the ROM 32.

The output of the ROM, which may be $2^B$ words having C bits each, is applied as the data to a nonlinear gain map RAM 34. The write address for the nonlinear-gain map is provided by the counter 16, and the read address is the input signal x.

Signal Detector/Estimator

Figure 5:
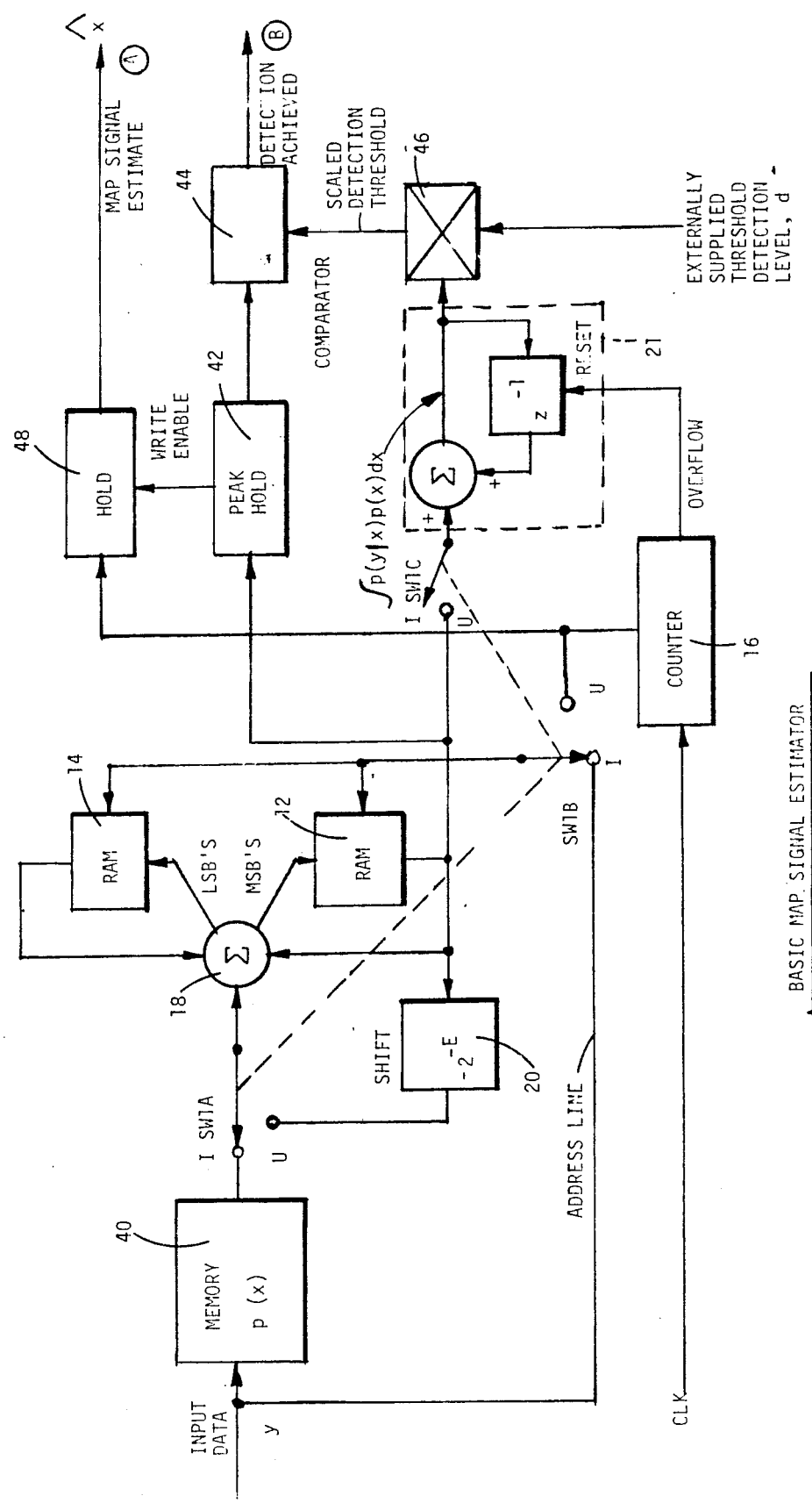
FIG. 5 shows a block diagram of the basic MAP (maximum a posteriori) signal detector/estimator constructed according to the invention.

An effective signal detector/estimator can be constructed based on the amplitude-density/distribution-function generator shown in FIG. 2 and described above. A preferred signal detector/estimator is illustrated in FIG. 5. The "1" input of the amplitude-density/distribution-function generator is replaced by the output of a memory 40 that contains the density function p(x) of the expected signal x. The memory 40 is addressed by the input data sample y, which is signal-plus-noise.

The two RAMs 12, 14, the summer 18, the $-2^{-E}$ scaling element 20, and the integrator 21, in conjunction with the B-bit counter 16, form an amplitude-density-function generator (ADFG), which operates substantially as described above in connection with the circuit of FIG. 2. But, during the first half of each clock period, the addressed location of the memory 12 is augmented by the value of the density function p(x), as supplied by the memory 40, rather than by the unitary increment. From that, the ADFG generates, at the output from the first RAM 12, the combined density function p(y|x) p(x). That combined density function output is the numerator of the expression for p(x|y) from equation (3) above.

The density function p(x) is applied to the ADFG by the memory 40, which is addressed by the input data y. If the expected signal x has stationary statistics, i.e., does not change over time, the memory 40 may be a ROM in which the given, expected density function p(x) has been stored.

The denominator of the expression for p(x|y) of equation (3) is obtained by integrating the combined density function p(y|x)p(x) in an integrator 21, and providing the output as a scale factor. The ADFG is, therefore, modified to include this scale factor integrator.

The maximum a posteriori (MAP) estimate is frequently used for signal detection. Therefore, the object is to find the peak of the conditional function p(x|y).

If the value of the abscissa corresponding to the peak of p(x|y) is independent of the scale factor k, as shown in FIG. 6, the scale factor represented by the denominator of equation (3) may be ignored. A peak-hold circuit 42 determines the peak of the combined density function p(y|x)p(x); and emits a "write enable" signal.

A comparator 44 is employed to determine if the maximum value of p(x|y) has exceeded a detection threshold, d, i.e., we assume that a detection has been achieved if $$kq(x) > d \qquad (7)$$

or $$q(x) > \frac{1}{k} d \qquad (8)$$

Detection is then indicated if $$p(x)p(y|x) > d \int_{-\infty}^{\infty} p(y|x)p(x)dx \qquad (9)$$

The peak-hold circuit 42 stores the peak of the density function p(y|x) p(x), which is provided by the ADFG. The output of the peak-hold device is applied to a comparator 44, where the peak is compared with a scaled detection threshold. The scaled detection threshold is provided by a threshold scaler 46. A threshold detection level, d, is provided to the threshold scaler 46. The output of the integrator 21 that integrates the combined density function p(y|x)p(x) is also supplied to the scaler 46. As described above, the output of the integrator 21 is the denominator of the expression of equation (3) for p(x|y), and serves for gain normalization. The peak value of the combined density function p(y|x)p(x) is compared in the comparator 44 with the scaled detection threshold, which is the right-hand side of equation (9). If the peak value of the combined density function exceeds that scaled threshold, a "detection achieved" signal is produced at "B".

The counter output addresses a hold circuit 48 with an independent value x. When the peak-hold circuit 42 identifies a peak of the density function p(y|x)p(x), that value is written into the hold circuit 48 at the address x. The hold circuit then produces an estimate of the signal x, designated x̂. As the counter 16 is a B-bit counter, when B is the number of bits representing each signal sample $x_n$ or signal-plus-noise sample $y_n$, the count is repeated after each B counts for x. The overflow signal resets the integrator.

The signal detector/estimator shown in FIG. 5, with the signal-density function p(x) permanently stored in a ROM 40 supplying the amplitude-density function generator, is appropriate for signals that do not change in time, having stationary statistics.

An adaptively updating signal detector/estimator is used when the signal has time-varying statistics. The density function p(x) is stored in an updateable memory, such as a random-access memory RAM, rather than a ROM, for application to the ADFG. The function p(x) stored in the memory is updated with the system shown in FIG. 7. The updating system is generally a second amplitude-density function generator.

The estimated signal x̂ output from the estimator is used as the input signal to the ADFG of FIG. 7 for updating p(x). The ADFG operates the same as the ADFG shown in FIG. 2. The computed amplitude-density function of the estimated signal x̂, p(x), is then input to the RAM 40, from which it is used in the signal estimator of FIG. 5 to update the signal estimate.

A set/reset flip-flop 52 and the "detection achieved" output of the signal detector/estimator are applied to an AND gate 54, to reset the B-bit counter 16a. This counter is not the same counter that is used in connection with the remainder of the signal detector/estimator. A connection is provided between the "detection achieved" output and the second counter 16a so the second counter is enabled only when the "detection achieved" signal is produced. That prevents the density function p(x) from being updated when the signal x has not been found in the input signal y.

A third Bayesian estimator is one that minimizes the mean-squared estimation error by mechanizing the equation:

$$x = \int_{-\infty}^{\infty} xp(x|y)dx = \frac{\int_{-\infty}^{\infty} xp(y|x)p(x)dx}{\int_{-\infty}^{\infty} p(y|x)p(x)dx} \quad (10)$$

Figure 8:
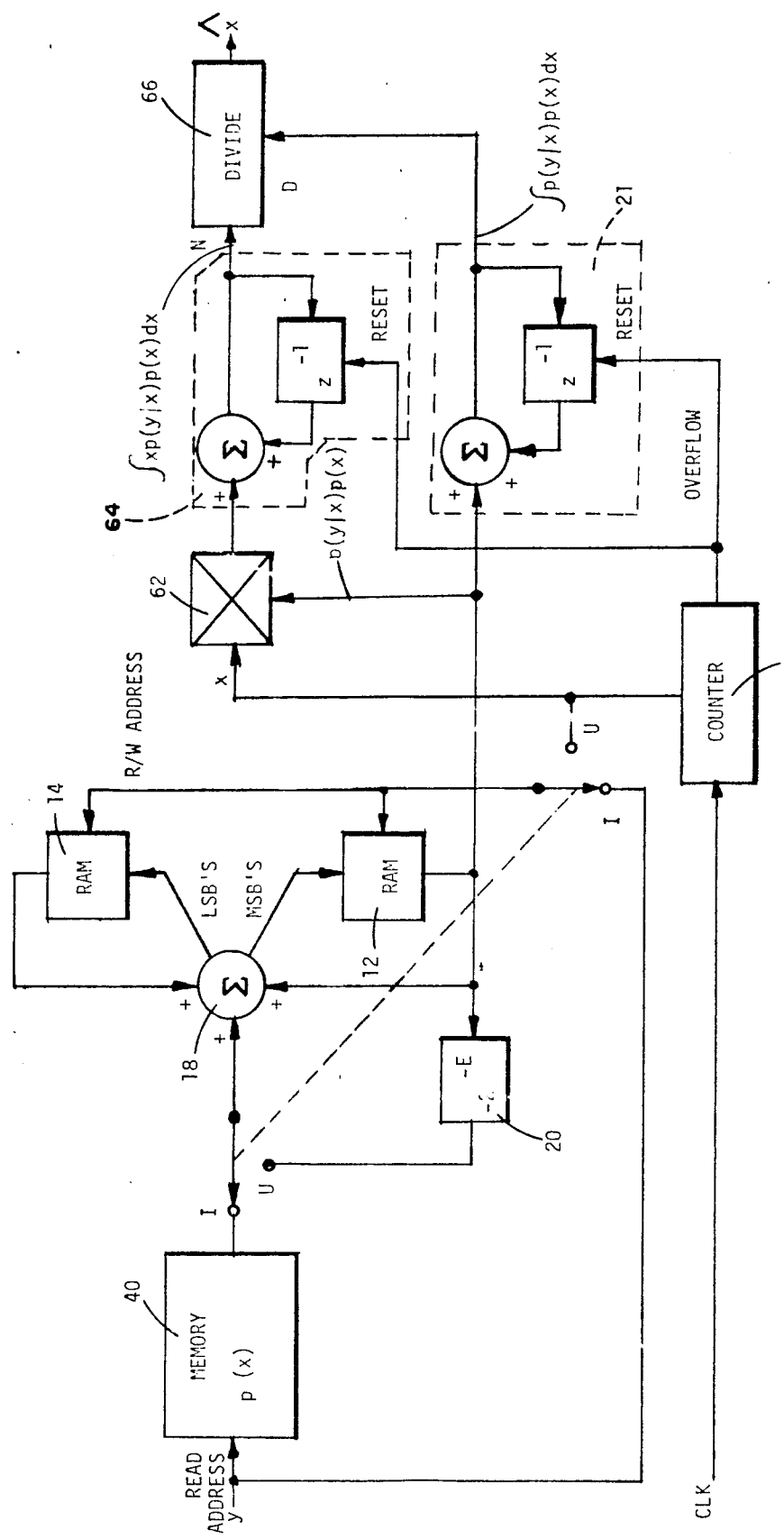
FIG. 8 shows a minimum mean squared error (MMSE) signal estimator of the invention.

A mechanization of the minimum-mean-squared-error (MMSE) equation is the MMSE signal estimator shown in FIG. 8. That MMSE signal estimator is similar to the signal estimators described above. The density function p(x) is stored in the memory 40, and is from there supplied to the ADFG to generate the combined density function p(y|x) p(x).

The combined density function p(y|x) p(x) is integrated in the integrator 21 to obtain the distribution function. The density function p(y|x) p(x) is also multiplied by the output of the counter, x, in a multiplier 62. The multiplier output, x p(y|x) p(x) is integrated in a second integrator 64 and applied to a divider 66 as the numerator for the divide operation. The distribution function ∫p(y|x) p(x)dx is applied to the divider 66 as the denominator. The output of the divider is the signal estimate x. The overflow signal from the B-bit counter 16 resets the two integrators 21, 64.

Figure 9:
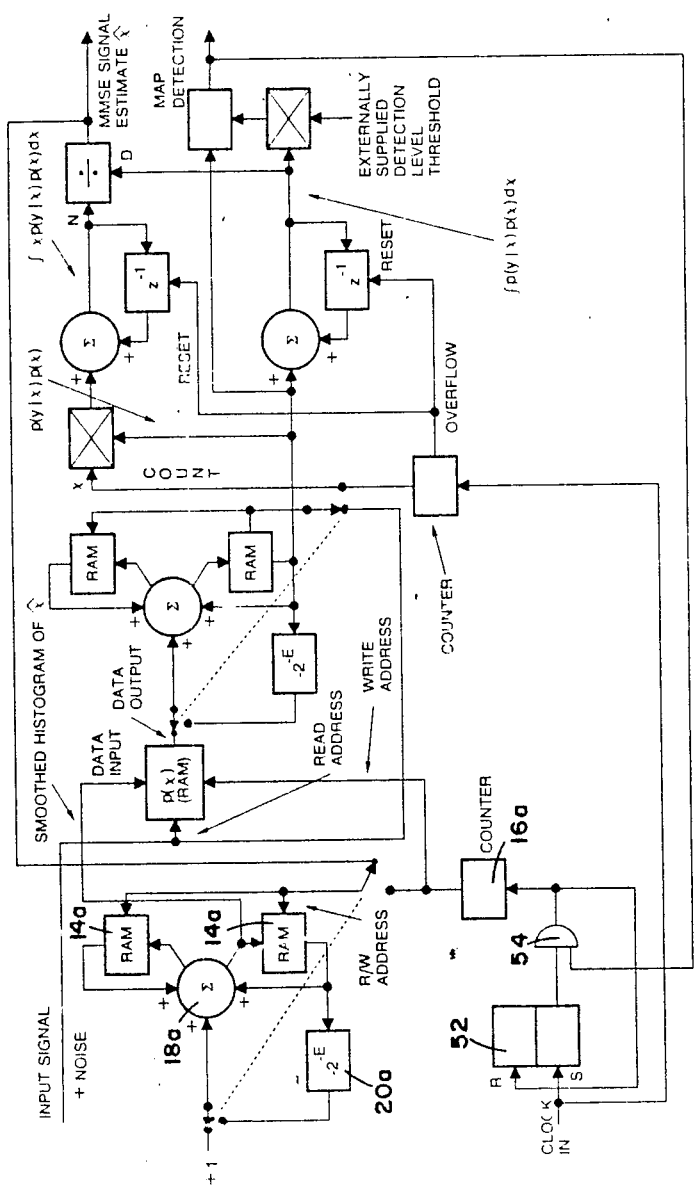
FIG. 9 shows a block diagram of an MMSE estimator for use with signals having non-stationary statistics.

For signals that do not change in time, i.e., those having stationary statistics, the memory 40 for the MMSE is of the read-only type in which the density function p(x) is permanently stored. The memory for the function p(x) may be changed to the random-access type and a mechanism added to update p(x) to provide a MMSE estimator for nonstationary signals, i.e., those having changing or nonstationary statistics. Such updating of p(x) may be provided by a second ADFG, which receives as its input signal the MMSE signal estimate output from the MMSE signal estimator. Such a structure is shown in FIG. 9. This second ADFG is the same as that shown in FIG. 7 and described above.

I claim:

1. A signal processor comprising:
   an input for receiving an input signal y, wherein:
      said input signal y has in it a signal x; and
      said input signal y has a conditional density function given that the signal x is present, p(y/x); and
      said signal x has an amplitude-density function p(x);
   a memory for storing the amplitude-density function p(x) of the signal x, wherein said memory is coupled to said input so that said memory is addressed by said input signal y;
   an amplitude-density function generator coupled to said input and to said memory for generating a combined density function p(y|x)p(x) comprising a product of said conditional density function p(y|x) and said amplitude-density function p(x):
   a threshold scaler comprising;
      an integrator for integrating said combined density function to produce an integrated product;
      an input for receiving an externally supplied threshold-detection level; and
      means for combining said integrated product and said externally supplied threshold-detection level to produce a scaled detection threshold, where said combining means is connected to a comparator for applying said scaled detection threshold to said comparator.

2. The signal processor of claim 1 wherein said combined density function has a peak, and said signal processor additionally comprises means for detecting the peak of said combined density function.

3. The signal processor of claim 2 wherein said comparator determines whether said peak of said combined density function exceeds a defined threshold, indicating that the signal x is indeed contained in the input signal y, and for producing a "detection achieved" output signal.

4. The signal processor of claim 2 additionally comprising means for reconstructing an estimate of the signal x from the peak of said combined density function.

5. The signal processor of claim 4 wherein said reconstruction means comprises a hold circuit for receiving an output of a counter, and which is written by said peak of said combined density function.

6. The signal processor of claim 5 additionally comprising means for updating the amplitude density function p(x) stored in said memory based on said estimate of the signal x.

7. The signal processor of claim 6 wherein said estimate of the signal x has an amplitude-density function and said updating means comprises a second amplitude-density-function generator having as its input said estimate of the signal x, and producing as its output the amplitude-density function of said estimate.

8. The signal processor of claim 7, additionally comprising:
   a comparator for determining whether the peak of said combined density function exceeds a defined threshold, and for producing a "detection achieved" output signal when said peak exceeds said threshold; and
   means for coupling the output of said comparator to a second counter to control said second counter so that said second counter is enabled only when said "detection achieved" signal is produced.

9. A signal estimator for estimating a signal x present in an input signal y, wherein said signal x has an amplitude-density function p(x) and said signal y has a conditional density function p(y|x) given that the signal x is present, said signal estimator comprising:
   an input for receiving said input signal y;
   a counter;
   a first memory for storing said amplitude-density function p(x), wherein said first memory is addressed by said input signal y;
   a second memory;
   an incrementer for adding the output of said first memory to the value stored at a given location of said second memory when said input signal y has a predetermined amplitude;
   a scaler coupled to an output of said second memory and to said counter for scaling the value stored at a given location in said second memory in response to an output from said counter, and storing at least a plurality of most-significant bits of the scaled value back at said given location of said second memory to generate a combined amplitude-density function $p(x) \, p(y|x)$;

a peak-hold circuit coupled to said output of said second memory for detecting and storing a peak of said combined amplitude density function; and a hold circuit comprising:
- a write enable input coupled to an output of said peak hold circuit to enable writing into said hold circuit said location of a detected peak of said combined amplitude density function;
- an address input coupled to an output of said counter so that said detected peak is written at an address corresponding to an output of said counter, so that said hold circuit generates an estimate of the signal x; and
- a signal estimate output line, on which is output said estimate of the signal x.

10. The signal estimator of claim 9, additionally comprising a third memory, and wherein said plurality of most-significant bits of the output of said scaler are stored in said second memory and a plurality of least-significant bits of the output of said scaler are stored in said third memory.

11. The signal estimator of claim 10, wherein said first memory comprises random-access memory, and said signal estimator additionally comprises means for updating the amplitude-density function $p(x)$ stored in said first memory based on the signal on said signal estimate output line.

12. The signal estimator of claim 11, wherein said updating means comprises:
- a fourth memory;
- a fifth memory;
- an incrementer for incrementing the value stored at a given location in said fourth memory when said signal estimate has a predetermined amplitude;
- a scaler for scaling the value stored at a given location in said fourth memory in response to an output from a second counter, and for storing at least a plurality of the most-significant bits of the scaled value back at said given location of said fourth memory to generate the amplitude density function of said signal estimate.

13. The signal estimator of claim 9, wherein said first memory comprises random-access memory, and said signal estimator additionally comprises means for updating the amplitude-density function $p(x)$ stored in said first memory based on the signal estimate on said signal estimate output line.

14. The signal estimator of claim 13, wherein said updating means comprises:
- a third memory;
- a second counter;
- an incrementer for incrementing the value stored at a given location in said third memory when said signal estimate has a predetermined amplitude;
- a scaler for scaling the value stored at a given location in said third memory in response to an output from said second counter, and storing at least a plurality of most significant bits of the scaled value back at said given location of said third memory to generate the amplitude density function of said signal estimate.

15. The signal estimator of claim 14, additionally comprising:
- a comparator for comparing the output of said peak-hold circuit with a predetermined threshold and determining whether the peak value of said combined amplitude-density function $p(x) \, p(y|x)$ exceeds a predetermined threshold; and
- means for coupling the output of said comparator to said second counter to control said second counter so that said second counter is enabled only when said combined amplitude-density function exceeds said threshold.

16. The signal estimator of claim 15, additionally comprising a threshold scaler comprising:
- an integrator for integrating said combined density function $p(x) \, p(y|x)$;
- an input for receiving an externally supplied threshold-detection level; and
- means for combining said integrated combined density function and said externally supplied detection threshold to generate a scaled detection threshold, wherein said combining means is connected to said comparator for applying said scaled detection threshold to said comparator.

17. A minimum-mean-squared-error signal estimator comprising:
- an input for receiving an input signal y, wherein:
  - said input signal y has in it a signal x;
  - said signal x has an amplitude density function $p(x)$;
  - said input signal y has a conditional density function, given that the signal x is present, $p(y|x)$;
- a counter;
- a memory for storing the amplitude-density function $p(x)$ of the signal x, wherein said memory is coupled to said input so that said memory is addressed by said input signal y;
- an amplitude-density-function generator coupled to said input and to said memory for generating a combined density function $p(x) \, p(y|x)$ comprising a product of said amplitude-density function $p(x)$ of said signal x and said conditional density function $p(y|x)$;
- a first integrator coupled to an output of said amplitude-density-function generator for generating a combined distribution function by accumulating said combined density function over time;
- a multiplier coupled to the output of said amplitude-density-function generator and to an output of said counter for generating the product of said combined density function and a count;
- a second integrator coupled to an output of said multiplier for accumulating over time said product of said combined density function and said count;
- a divider coupled to an output of said first integrator and to an output of said second integrator for dividing the output of said second integrator by the output of said first integrator; and
- an output line coupled to an output of said divider.

18. The minimum-mean-squared-error signal estimator of claim 17, wherein the output fo said divider comprises an estimate of the signal x, and said minimum-mean-squared error signal estimator additionally comprises means for updating the amplitude-density function $p(x)$ stored in said memory based on the signal on said output line.

19. The minimum-mean-squared-error signal estimator of claim 17, wherein said amplitude-density-function generator comprises:
- a second memory;

an incrementer coupled to said first memory for adding the output of said first memory to the value stored at a given location of said second memory in response to an input signal y of a predetermined amplitude;

a scaler for scaling the value stored at a given location in said second memory in response to an output from said counter, and for storing at least a plurality of most-significant bits of the scaled value back at said given location of said second memory to generate said combined amplitude-density function $p(x) p(y|x)$; and a density function output line coupled to said second memory for said combined density function.

20. The minimum-mean-squared-error signal estimator of claim 19, wherein said first memory comprises random-access memory, and said signal estimator additionally comprises means for updating the amplitude-density function $p(x)$ stored in said first memory based on the signal on said signal estimate output line, said updating means comprising:

a third memory;

a second counter;

an incrementer for incrementing the value stored at a given location in said third memory when said signal estimate has a predetermined amplitude;

a scaler for scaling the value stored at a given location in said second memory in response to an output from said second counter, and storing at least a plurality of most-significant bits of the scaled value back at said given location of said third memory to generate the amplitude-density function of said signal estimate.

21. A minimum-mean-squared-error signal estimator for estimating a signal x present in an input signal y, wherein said signal x has an amplitude-density function $p(x)$ and said signal y has a conditional density function $p(y|x)$ given that the signal x is present, said signal estimator comprising:

an input for receiving said input signal y;

a counter;

a first memory for storing said amplitude-density function $p(x)$, wherein said first memory is addressed by said input signal y;

a second memory;

an incrementer coupled to said first memory for adding an output of said first memory to the value stored at a given location of said second memory in response to an input signal y of a predetermined amplitude;

a scaler for scaling the value stored at a given location in said second memory in response to an output from said counter, and for storing at least a plurality of most-significant bits of the scaled value back at said given location of said second memory to generate a combined amplitude-density function $p(x) p(y|x)$;

a density-function output line coupled to said second memory for said combined amplitude density function $p(x) p(y|x)$;

a first integrator coupled to said density-function output line for generating a combined distribution function by accumulating said combined density function over time;

a multiplier coupled to said density function output line and to said counter for generating a product of said combined density function and a count;

a second integrator coupled to an output of said multiplier for accumulating said product over time;

a divider coupled to an output of said first integrator and to an output of said second integrator for dividing the output of said second integrator by the output of said first integrator to generate an estimate of said signal x; and an estimate output line coupled to the output of said divider for said signal estimate.

22. The minimum-mean-squared-error signal estimator of claim 21, wherein said first memory comprises random access memory, and said signal estimator additionally comprises means for updating the amplitude-density function $p(x)$ stored in said first memory based on the signal estimate on said estimate output line.

23. The minimum-mean-squared-error signal estimator of claim 22, wherein said updating means comprises:

a second counter;

a fourth memory;

a fifth memory;

an incrementer for incrementing the value stored at a given location in said fourth memory when said signal estimate has a predetermined amplitude;

a scaler for scaling the value stored at a given location in said fourth memory in response to an output from said second counter, and for storing a plurality of most-significant bits of the scaled value back at said given location of said fourth memory to generate the amplitude-density function of said signal estimate, and for storing a plurality of least-significant bits of said scaled value at a corresponding location of said fifth memory.

24. The minimum-mean-squared-error signal estimator of claim 23, additionally comprising:

a comparator coupled to said density function output line for comparing said density function with a threshold and producing a "detection achieved" signal when the value of said density function exceeds said threshold;

means for coupling the output of said comparator to said second counter to control said second counter, so that said second counter is enabled only when said 'detection achieved' signal is produced.

* * * * *